United States Patent
Ichihashi et al.

(10) Patent No.: US 6,519,016 B1
(45) Date of Patent: Feb. 11, 2003

(54) PHASE RETARDER COMPRISING TWO OPTICALLY ANISOTROPIC LAYERS

(75) Inventors: Mitsuyoshi Ichihashi, Fujinomiya (JP); Ken Kawata, Minami-ashigara (JP); Kohei Arakawa, Odawara (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 289 days.

(21) Appl. No.: 09/667,222

(22) Filed: Sep. 21, 2000

(30) Foreign Application Priority Data

Sep. 22, 1999 (JP) ............................................. 11-268797

(51) Int. Cl.[7] ........................................... G02F 1/1335
(52) U.S. Cl. ........................ 349/117; 359/494; 359/497; 359/499
(58) Field of Search ................................. 359/494, 497, 359/499

(56) References Cited

U.S. PATENT DOCUMENTS

| 5,196,953 | A | * | 3/1993 | Yeh et al. | 349/119 |
| 5,612,801 | A | * | 3/1997 | Winker | 349/117 |
| 6,025,958 | A | * | 2/2000 | Yamaoka et al. | 349/5 |
| 6,307,676 | B1 | * | 10/2001 | Merrill et al. | 359/490 |

* cited by examiner

Primary Examiner—James Dudek
(74) Attorney, Agent, or Firm—Burns, Doane, Swecker & Mathis, LLP

(57) ABSTRACT

A phase retarder comprises two optically anisotropic layers A & B. The optically anisotropic layer A essentially gives the phase retardation of π at wavelength of 550 nm, and the optically anisotropic layer B essentially gives the phase retardation of π/2 at wavelength of 550 nm. The layers A and B are laminated so that the retarder has such an optical characteristic that a retardation value per wavelength is within the range of 0.2 to 0.3 at each wavelength of 450 nm, 550 nm and 650 nm. The total thickness of the layers A and B is within the range of 500 nm to 20 μm.

9 Claims, 1 Drawing Sheet

PHASE RETARDER COMPRISING TWO OPTICALLY ANISOTROPIC LAYERS

FIELD OF THE INVENTION

The present invention relates to a phase retarder comprising at least two optically anisotropic layers, and a circularly polarizing plate equipped with the phase retarder. In detail, the invention relates to a phase retarder suitable for a quarter wave plate used in a liquid crystal display of reflection type, a GH-LCD, a PS conversion devise, an anti-reflection film or a pick-up for writing on optical discs.

BACKGROUND OF THE INVENTION

Various quarter wave plates have been proposed and used in optical devices such as an LCD of reflection type, a pick-up for optical discs and a PS conversion devise. However, most of the conventional plates can function as a quarter wave plate merely at a specific wavelength.

Each of Japanese Patent Provisional Publication Nos. 10(1998)-68816 and 10(1998)-90521 discloses a phase retarder comprising two optically anisotropic polymer films. The phase retarder of 10(1998)-68816 comprises a quarter wave plate (which retards birefringent light by $\lambda/4$) and a half wave plate (which retards birefringent light by $\lambda/2$) laminated so that the optical axes may be crossed. The phase retarder of 10(1998)-90521, on the other hand, comprises at least two retarders having a retardation value of 160 to 320 nm, and the retarders are laminated so that their slow axes may be neither parallel nor perpendicular to each other. Each disclosed phase retarder comprises two polymer films, and gives the phase retardation of $\lambda/4$ within a wide wavelength region.

SUMMERY OF THE INVENTION

The phase retarders disclosed in Japanese Patent Provisional Publication Nos. 10(1998)-68816 and 10(1998)-90521 are considerably thick, because they are prepared by laminating two polymer films. In examples described in 10(1998)-90521, two or more polycarbonate films (Sumika right SEF-460270B and SEF-460266B7, Sumitomo Chemicals Co., Ltd.) are laminated. Since each polycarbonate film has a 60 $\mu$m thickness, the total thickness is 120 $\mu$m or more. Also in 10(1998)-68816, though there is no description of the thickness, the total thickness is presumed to be 120 $\mu$m or more because polycarbonate films are also used in example embodiments.

A quarter wave plate or a circularly polarizing plate is mainly used in a liquid crystal display, which is relatively thin and light as compared with other image displaying devises. Accordingly, the quarter wave plate or the circularly polarizing plate is preferred to be as thin and light as possible. In addition, a liquid crystal display (e.g., a liquid crystal display of host-guest type) in which a quarter wave plate is provided between two substrates of the liquid crystal cell has been recently proposed. The quarter wave plate used in that display is particularly required to be thinner than a conventional one because the plate is placed inside the liquid crystal cell. Even if it is placed outside the cell, a thin quarter wave plate gives very good effects when used in a liquid crystal display which adopts plastic substrates to make the display thin and light or in a liquid crystal display of reflection type which is developed to reduce parallax.

An object of the invention is to provide a very thin quarter wave plate usable within a wide wavelength region.

The present invention provides a phase retarder which comprises an optically anisotropic layer A essentially giving the phase retardation of $\pi$ at wavelength of 550 nm and an optically anisotropic layer B essentially giving the phase retardation of $\pi/2$ at wavelength of 550 nm, said layers A and B being laminated so that the retarder may have such an optical characteristic that a retardation value per wavelength is within the range of 0.2 to 0.3 at each wavelength of 450 nm, 550 nm and 650 nm, wherein the total thickness of the optically anisotropic layers A and B is within the range of 500 nm to 20 $\mu$m.

The invention also provides a circularly polarizing plate which comprises a phase retarder and a polarizing membrane provided thereon, said phase retarder comprising an optically anisotropic layer A essentially giving the phase retardation of $\pi$ at wavelength of 550 nm and an optically anisotropic layer B essentially giving the phase retardation of $\pi/2$ at wavelength of 550 nm, said layers A and B being laminated so that the retarder may have such an optical characteristic that a retardation value per wavelength is within the range of 0.2 to 0.3 at each wavelength of 450 nm, 550 nm and 650 nm, wherein the total thickness of the optically anisotropic layers A and B is within the range of 500 nm to 20 $\mu$m.

The applicants have succeeded in preparing a very thin quarter wave plate usable within a wide wavelength region. The plate comprises optically anisotropic layers A and B, and the total thickness of the layers is less than 10 $\mu$m. In detail, the phase retarder is prepared by forming at least one (preferably, both) of the optically anisotropic layers A and B from liquid crystal molecules and then transferring them. Thus, a thin and light quarter wave plate or circularly polarizing plate suitable for a liquid crystal display and usable within a wide wavelength region can be obtained.

Since the optically anisotropic layer is formed from liquid crystal molecules, the optical characteristics can be easily controlled. The optical direction of the optically anisotropic layer containing the liquid crystal molecules can be also easily controlled by selecting the rubbing direction of the liquid crystal molecules. Consequently, it is unnecessary to cut films into chips in a conventional manner.

Further, the optically anisotropic layer formed from liquid crystal molecules has strong heat-resistance as compared with the layer of polymer film. When a quarter wave plate comprising the optically anisotropic layer of polymer film is placed between the two substrates of the liquid crystal cell, it is feared that the polymer film may be transformed at the temperature for aligning rod-like liquid crystal molecules in the cell.

According to the present invention, a very thin quarter wave plate usable within a wide wavelength region can be easily prepared.

DETAILED DESCRIPTION OF THE INVENTION

Optical Characteristics of Phase Retarder

Figure 1:
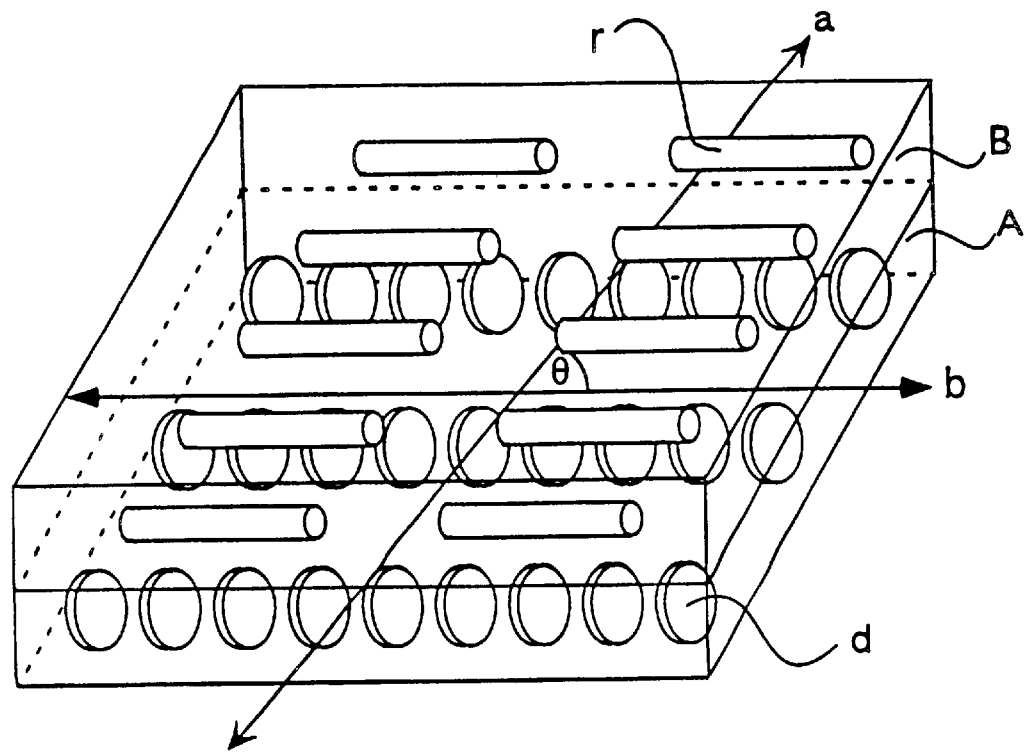
FIG. 1 is a sectional view schematically illustrating a typical phase retarder of the invention.

The optically anisotropic layer A is set to essentially give the phase retardation of $\pi$ at wavelength of 550 nm, and the retardation value of the layer A is within the range of preferably 210 to 300 nm, more preferably 220 to 296 nm, further preferably 230 to 292 nm, furthermore preferably 240 to 288 nm, most preferably 250 to 284 nm.

The optically anisotropic layer B is set to essentially give the phase retardation of π/2 at wavelength of 550 nm, and the retardation value of the layer B is within the range of preferably 115 to 150 nm, more preferably 118 to 148 nm, further preferably 121 to 146 nm, furthermore preferably 122 to 144 nm, most preferably 125 to 142 nm.

When the phase retarder is used in a circularly polarizing plate, the optical axes of the two optically anisotropic layers and the polarizing membrane are set so that the circularly polarizing plate may give almost completely circularly polarized light.

By thus setting the optical directions, the retardation of π/4 can be obtained within a wide wavelength region. For example, the angle between the slow axis (the direction giving the maximum refractive index in plane) of the optically anisotropic layer A and that of the layer B, the angle between the slow axis of the layer A and the polarizing axis (the direction giving the maximum transmittance in plane) of the polarizing membrane and the angle between the slow axis of the layer B and the polarizing axis of the polarizing membrane are set at 60°, 15° and 75°, respectively, so as to obtain almost complete circularly polarized light within the whole visible wavelength region (i.e., to obtain the retardation of λ/4 within a wide wavelength region). Otherwise, the angle between the slow axis of the layer A and that of the layer B, the angle between the slow axis of the layer A and the polarizing axis of the polarizing membrane and the angle between the slow axis of the layer B and the polarizing axis of the polarizing membrane may be set at 60°, 75° and 15°, respectively.

Each of the above angles has an allowance within ±10°, preferably ±5°.

The term "the retardation of λ/4 within a wide wavelength region" means that a retardation value per wavelength is within the range of 0.2 to 0.3 at each wavelength of 450 nm, 550 nm and 650 nm. The retardation value per wavelength is preferably within the range of preferably 0.21 to 0.29, more preferably 0.22 to 0.28, further preferably 0.23 to 0.27, most preferably 0.24 to 0.26.

Structure of Phase Retarder and Circularly Polarizing Plate

FIG. 1 is a sectional view schematically illustrating a typical embodiment of a phase retarder according to the invention.

The phase retarder in FIG. 1 comprises an optically anisotropic layer A (A) formed from discotic liquid crystal molecules and an optically anisotropic layer B (B) formed from rod-like crystal molecules, and the layers A and B are laminated. The angle (θ), in the same plane, between the slow axis (a) of the layer A and that (b) of the layer B is 60°.

The optically anisotropic layer A comprises vertically aligned discotic liquid crystal molecules (d). The disc planes of the molecules (d) are parallel to the slow axis (a) of the layer A.

The optically anisotropic layer B comprises horizontally aligned rod-like liquid crystal molecules (r). The long axes of the molecules (r) are parallel to the slow axis (b) of the layer B.

Figure 2:
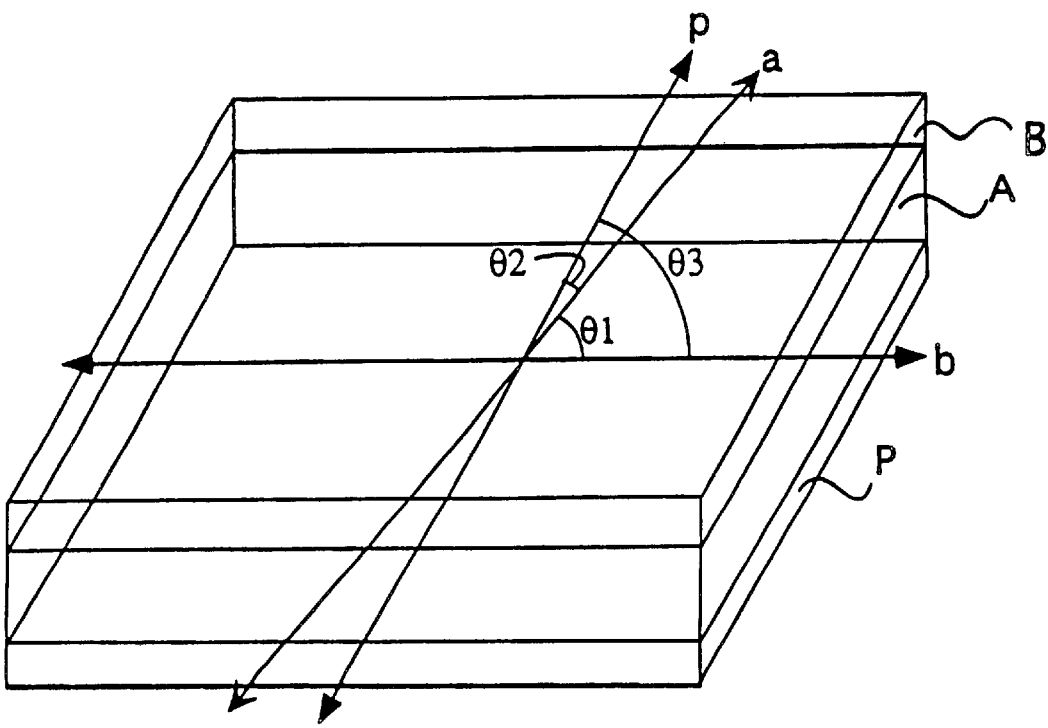
FIG. 2 schematically illustrates a layered structure of a circularly polarizing plate.

FIG. 2 schematically illustrates a layered structure of a circularly polarizing plate.

The circularly polarizing plate in FIG. 2 comprises a polarizing membrane (P), an optically anisotropic layer A (A) and an optically anisotropic layer B (B), piled up in this order.

In the plate shown in FIG. 2, the angle (θ1) between the slow axis (a) of the layer A and that (b) of the layer B in the same plane, the angle (θ2) between the slow axis (a) of the layer A and the polarizing axis (p) of the polarizing membrane (P) and the angle (θ3) between the slow axis (b) of the layer B and the polarizing axis (p) of the polarizing membrane (P) are 60°, 15° and 75°, respectively.

Optically Anisotropic Layer

At least one of the optically anisotropic layers A and B is preferably formed from liquid crystal molecules, and more preferably both layers are formed from liquid crystal molecules. The liquid crystal molecules are preferably discotic or rod-like liquid crystal molecules. Particularly preferably, one of the layers A and B is formed from discotic liquid crystal molecules and the other is formed from rod-like liquid crystal molecules.

Preferably, the liquid crystal molecules are essentially homogeneously aligned. More preferably they are fixed with their homogeneous alignment maintained, and most preferably they are fixed by a polymerization reaction.

In the case that discotic liquid crystal molecules are used, the molecules are preferably vertically aligned. An average inclined angle of the discotic liquid crystal molecules is preferably in the range of 50° to 90°. The discotic liquid crystal molecules can also be obliquely aligned (an oblique alignment). The inclined angle of the discotic liquid crystal molecule can be gradually changed (a hybrid alignment). The average inclined angle is preferably in the range of 50° to 90°, even if discotic liquid crystal molecules are aligned according to the oblique alignment or the hybrid alignment.

The discotic liquid crystal molecule is described in various documents (C. Destrade et al, Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal molecule is described in Japanese Patent Provisional Publication No. 8(1996)-27284.

For fixing the aligned discotic liquid crystal molecules by a polymerization reaction, a polymerizable group should be bound to a discotic core of the discotic liquid crystal molecule. However, if the polymerizable group is directly bound to the discotic core, it is difficult to keep the alignment through the polymerization reaction. Therefore, a linking group is introduced between the discotic core and the polymerizable group. Accordingly, the discotic liquid crystal molecule having a polymerizable group (polymerizable discotic liquid crystal molecule) preferably is represented by the following formula (I).

D(-L-P)$_n$       (I)

in which D is a discotic core; L is a divalent linking group; P is a polymerizable group; and n is an integer of 4 to 12.

Examples of the discotic cores (D) are shown below. In the examples, LP (or PL) means the combination of the divalent linking group (L) and the polymerizable group (P).

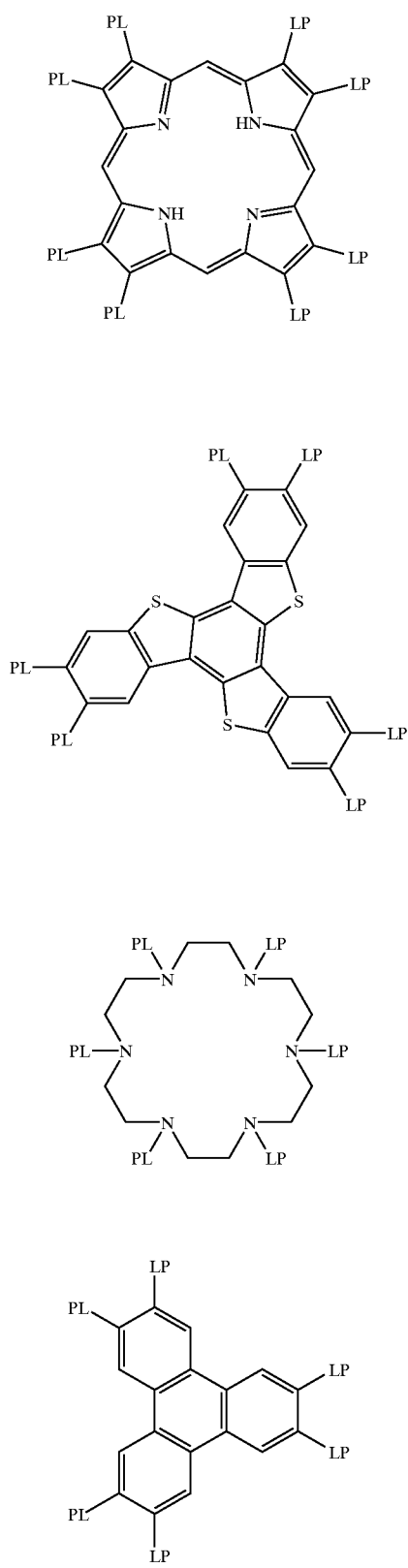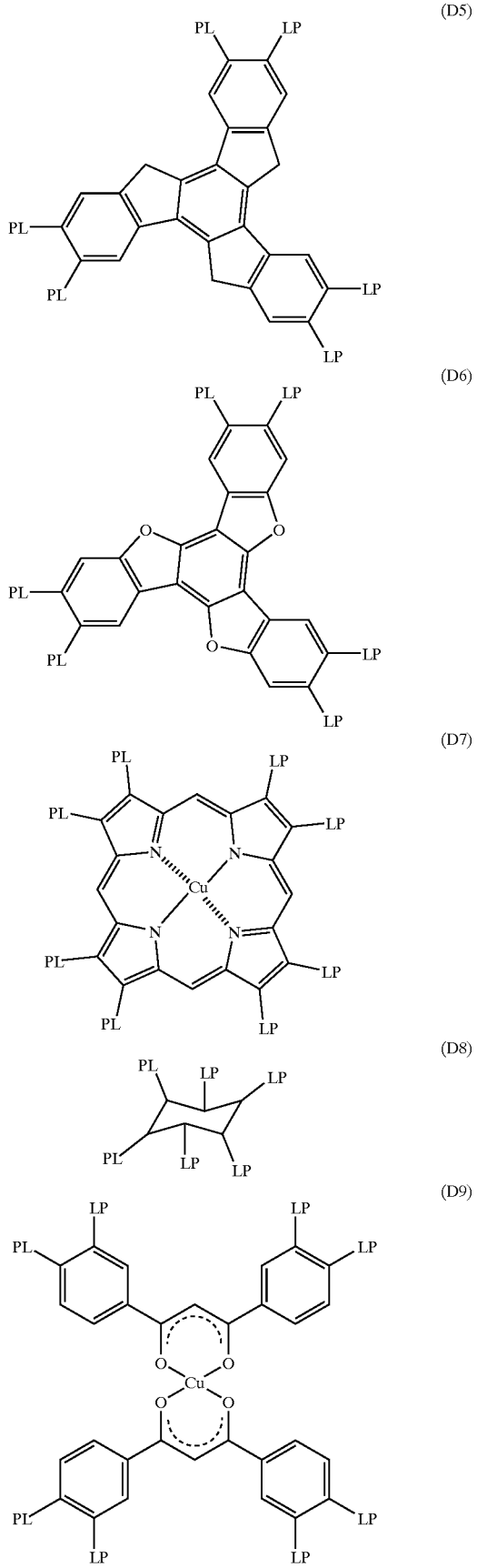

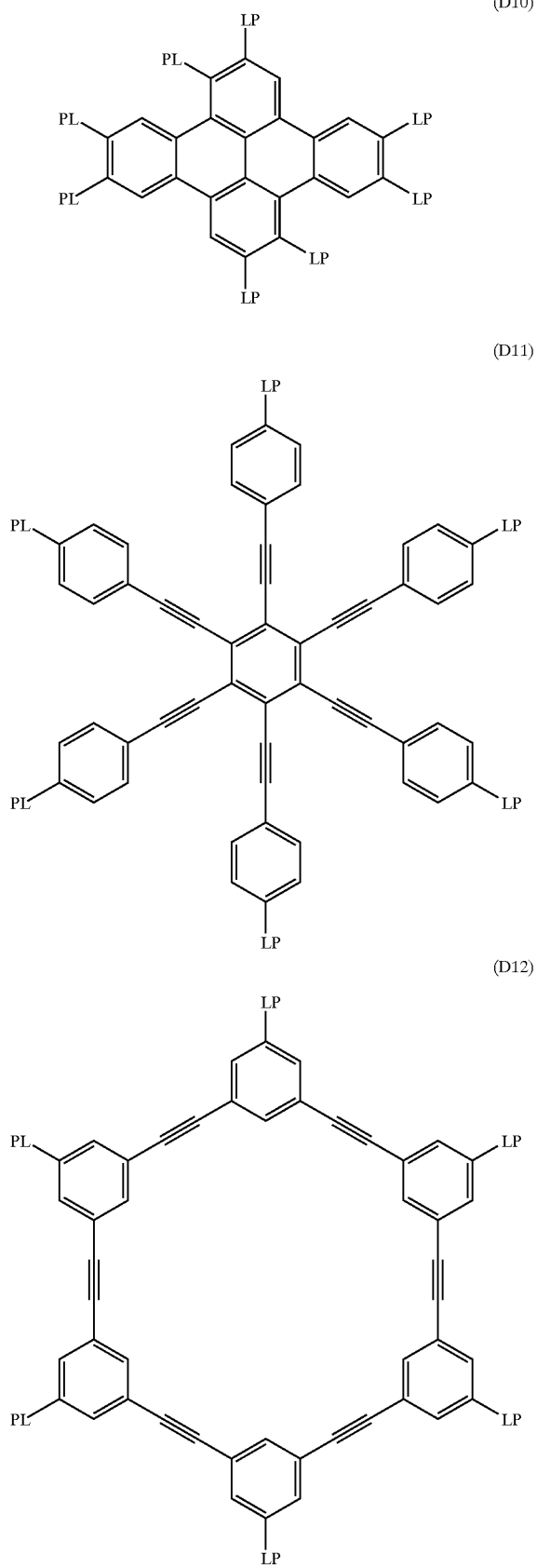

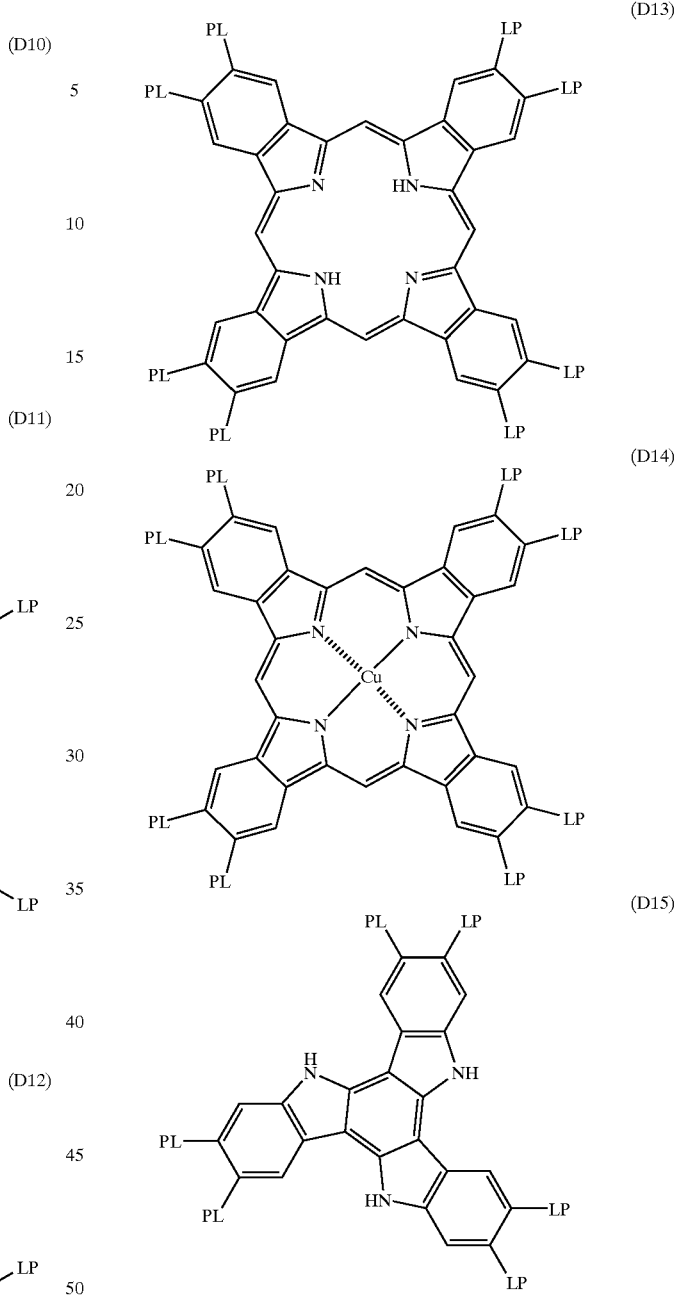

In the formula (I), the divalent linking group (L) preferably is selected from the group consisting of an alkylene group, an alkenylene group, an arylene group, —CO, —NH—, —O—, —S— and combinations thereof. L more preferably is a divalent linking group comprising at least two divalent groups selected from the group consisting of an alkylene group, an alkenylene group, an arylene group, —CO—, —NH—, —O— and —S—. L further preferably is a divalent linking group comprising at least two divalent groups selected from the group consisting of an alkylene group, an alkenylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group can have a substituent group (such as an alkyl group, a halogen atom, cyano, an alkoxy group, an acyloxy group).

Examples of the divalent linking groups (L) are shown below. In the examples, the left side is attached to the discotic core (D), and the right side is attached to the polymerizable group (P). The AL means an alkylene group or an alkenylene group. The AR means an arylene group.

L1: —AL—CO—O—AL—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18: —O—CO—AR—O—AL—O—CO—
L19: —O—CO—AR—O—AL—O—AL—O—CO—
L20: —O—CO—AR—O—AL—O—AL—O—AL—O—CO—
L21: —S—AL—
L22: —S—AL—O—
L23: —S—AL—O—CO—
L24: —S—AL—S—AL—
L25: —S—AR—AL—

The polymerizable group (P) is determined according to the polymerization reaction. Examples of the polymerizable groups (P) are shown below.

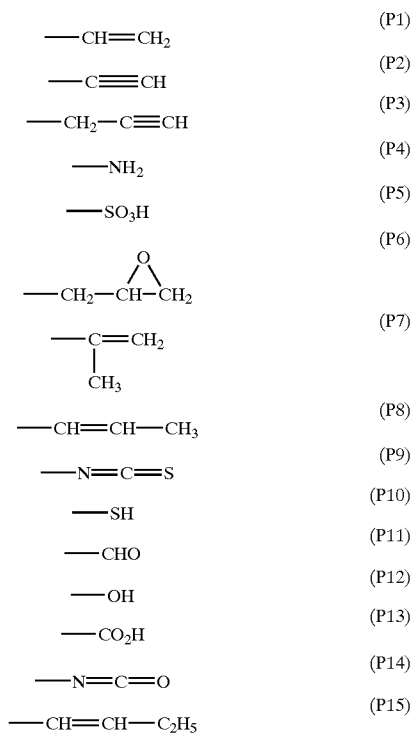

The polymerizable group (P) preferably is an unsaturated polymerizable group (P1 to P3, P7, P8, P15 to P17) or an epoxy group (P6, P18), more preferably is an unsaturated polymerizable group, and most preferably is an ethylenically unsaturated group (P1, P7, P8, P15 to P17).

In the formula (I), n is an integer of 4 to 12, which is determined by the chemical structure of the discotic core (D). The 4 to 12 combinations of L and P can be different from each other. However, the combinations are preferably identical.

Two or more discotic liquid crystal molecules can be used in combination. For example, a molecule containing asymmetric carbon atom in the divalent linking group (L) can be used in combination with a molecule containing no asymmetric carbon atom.

In the case that rod-like liquid crystal molecules are used, it is preferred that the molecules be essentially horizontally (homogeneously) aligned. Here, 'essentially horizontally (homogeneously) aligned' mean that the average inclined angle of the rod-like liquid crystal molecule is within the range of 0° to 40°, in which the inclined angle of the rod-like liquid crystal molecule means an angle between a long axis of a rod-like liquid crystal molecule and a surface plane of an optically anisotropic layer. The rod-like liquid crystal molecules can also be obliquely aligned (an oblique alignment), or the inclined angle of the rod-like liquid crystal molecule can be gradually changed (a hybrid alignment). The average inclined angle is preferably in the range of 0° to 40°, even if the liquid crystal molecules are aligned according to the oblique alignment or the hybrid alignment.

Examples of the rod-like liquid crystal molecules include azomethines, azoxys, cyanobiphenyls, cyanophenyl esters, benzoic esters, phenyl cyclohexanecarboxylates, cyanophenylcyclohexanes, cyano-substituted phenylpyrimidines, alkoxyl-substituted phenylpyrimidines, phenyldioxanes, tolanes and alkenylcyclohexylbenzonitriles. Besides these relatively low-molecular weight compounds, polymers of rod-like liquid crystal molecules can also be used in an optically anisotropic layer.

Particularly preferably, in the same manner as described for the discotic liquid crystal molecules, a polymerizable group (P) is introduced to the rod-like liquid crystal molecule so that the molecules may be fixed by a polymerization reaction with their horizontal alignment maintained.

Each optically anisotropic layer has a thickness of preferably 100 nm to 10 μm, more preferably 500 nm to 10 μm, most preferably 2 to 8 μm.

The total thickness of the optically anisotropic layers A and B is in the range of 500 nm to 20 μm, preferably 600 nm to 15 μm.

Orientation Layer

For essentially vertically aligning discotic liquid crystal molecules, it is important to reduce a surface energy of an orientation layer. In detail, a functional group decreases the surface energy so as to erect discotic liquid crystal molecules. A hydrocarbon group containing 10 or more carbon atoms can be effectively used as the functional group. Fluorine atom can also be effectively used as the functional group. The hydrocarbon group or fluorine atom is introduced into a side chain of a polymer rather than a main chain, to arrange the hydrocarbon group or the fluorine atom on the surface of the orientation layer.

The fluoropolymer contains fluorine atoms preferably in an amount of 0.05 to 80 wt. %, more preferably in an amount of 0.1 to 70 wt. %, further preferably in an amount of 0.5 to 65 wt. %, and most preferably in an amount of 1 to 60 wt. %.

The hydrocarbon group is an aliphatic group, an aromatic group or a combination thereof. The aliphatic group can have a branched or cyclic structure. The aliphatic group preferably is an alkyl group (including a cycloalkyl group) or an alkenyl group (including a cycloalkenyl group). The hydrocarbon group can have a substituent group that is not strongly hydrophilic, such as a halogen atom. The hydrocarbon group contains preferably 10 to 100 carbon atoms, more preferably 10 to 60 carbon atoms, and most preferably 10 to 40 carbon atoms.

The polymer preferably has a main chain of a polyimide structure or a polyvinyl alcohol structure.

The polyimide is usually synthesized by a condensation reaction of a tetracarboxylic acid and diamine. Two or more tetracarboxylic acids, or two or more diamines can be used to synthesize a copolymerized polyimide. The hydrocarbon group can be present in repeating units derived from the tetracarboxylic acids, in repeating units derived from the diamines, or in both of the repeating units. The fluorine atom can also be present in the tetracarboxylic acid repeating units, in the diamine repeating units or in both of the repeating units.

In the case that the hydrocarbon group is introduced into the polyimide, the polymer preferably has a steroid structure in its side chain or its main chain. The steroid structure present in the side chain is included in the hydrocarbon side chain containing 10 or more carbon atoms. Therefore, the steroid structure in the side chain has a function of aligning discotic liquid crystal molecules essentially vertically. In the present specification, the steroid structure means a cyclopentanohydrophenanthrene ring or a ring obtained by replacing a single bond of the cyclopentanohydrophenanthrene ring with a double bond so long as the ring is aliphatic (not forming an aromatic ring).

A denatured polyvinyl alcohol containing fluorine atoms is also preferably used in the orientation layer for vertically aligning the liquid crystal molecules.

The denatured polyvinyl alcohol containing fluorine atoms comprises repeating units containing fluorine atoms preferably in an amount of 5 to 80 mole %, and more preferably in an amount of 7 to 70 mole %.

A preferred denatured polyvinyl alcohol containing fluorine atoms is represented by the formula (PV):

—(VAl)$_x$—(FRU)$_y$—(VAc)$_z$— (PV)

in which VAl is a vinyl alcohol repeating unit; FRU is a repeating unit containing fluorine atoms; VAc is a vinyl acetate repeating unit; x is 20 to 95 mole % (preferably 24 to 90 mole %); y is 5 to 80 mole % (preferably 7 to 70 mole %); and z is 0 to 30 mole % (preferably 2 to 20 mole %)

Preferred repeating units containing fluorine atoms (FRU) are represented by the formulas (FRU-I) and (FRU-II):

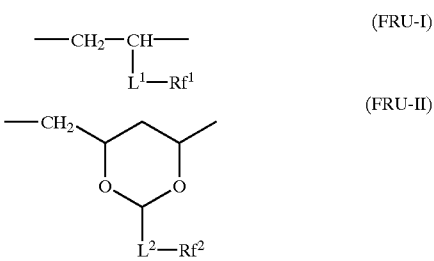

in which $L^1$ is a divalent linking group selected from the group consisting of —O—, —CO—, —SO$_2$—, —NH—, —alkylene—, —arylene— and a combination thereof; $L^2$ is a single bond or a divalent linking group selected from the group consisting of —O—, —CO—, —SO$_2$—, —NH—, —alkylene—, —arylene— and a combination thereof; and each of $Rf^1$ and $Rf^2$ is a hydrocarbon group substituted with fluorine atom.

The alkylene group and the arylene group can be substituted with fluorine atom.

Examples of the divalent linking groups formed by the combinations are shown below.

L1: —O—CO—
L2: —O—CO—alkylene—O—
L3: —O—CO—alkylene—CO—NH—
L4: —O—CO—alkylene—NH—SO$_2$—arylene—O—
L5: —arylene—NH—CO—
L6: —arylene—CO—O—
L7: —arylene—CO—NH—
L8: —arylene—O—
L9: —O—CO—NH—arylene—NH—CO—

The hydrocarbon group substituted with fluorine atom is an aliphatic group, an aromatic group or a combination thereof. The aliphatic group can have a linear, branched or cyclic structure, and preferably is an alkyl group (including a cycloalkyl group) or an alkenyl group (including a cycloalkenyl group). The aliphatic group can have, other than the fluorine atom, a substituent group that is not strongly hydrophilic, such as other halogen atoms. The hydrocarbon group contains preferably 1 to 100 carbon atoms, more preferably 2 to 60 carbon atoms, and most preferably 3 to 40 carbon atoms. The ratio of fluorine atoms substituting hydrogen atoms is in the range of preferably 50 to 100 mole %, more preferably 70 to 100 mole %, further preferably 80 to 100 mole %, and most preferably 90 to 100 mole %.

A denatured polyvinyl alcohol having a hydrocarbon group of 10 or more carbon atoms is also preferably used in the orientation layer for vertically aligning the liquid crystal molecules. The hydrocarbon group is an aliphatic group, an aromatic group or a combination thereof. The aliphatic group can have a linear, branched or cyclic structure. The aliphatic group preferably is an alkyl group (including a cycloalkyl group) or an alkenyl group (including a cycloalkenyl group). The hydrocarbon group can have a substituent group that is not strongly hydrophilic, such as a halogen atom. The hydrocarbon group contains preferably 10 to 100 carbon atoms, more preferably 10 to 60 carbon atoms, and most preferably 10 to 40 carbon atoms in total.

The denatured polyvinyl alcohol having a hydrocarbon group comprises hydrocarbon repeating units preferably in an amount of 2 to 80 mol %, and more preferably in an amount of 3 to 70 mol %. The repeating unit has a hydrocarbon group containing 10 or more carbon atoms.

A preferred denatured polyvinyl alcohol having a hydrocarbon group containing 10 or more carbon atoms is represented by the formula (PV):

$$—(VAl)_x—(HyC)_y—(VAc)_z—\quad\quad (PV)$$

in which VAl is a vinyl alcohol repeating unit; Hyc is a repeating unit having a hydrocarbon group containing 10 or more carbon atoms; VAc is a vinyl acetate repeating unit; x is 20 to 95 mol % (preferably 25 to 90 mol %); y is 2 to 80 mol % (preferably 3 to, 70 mol %); and z is 0 to 30 mol % (preferably 2 to 20 mol %).

Preferred repeating units having a hydrocarbon group containing 10 or more carbon atoms (HyC) are represented by the formulas (HyC-I) and (HyC-II):

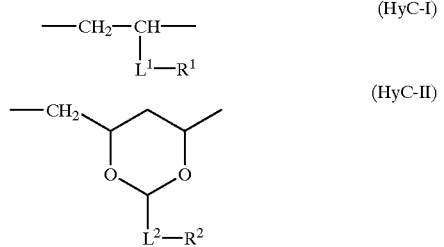

in which $L^1$ is a divalent linking group selected from the group consisting of —O—, —CO—, —SO$_2$—, —NH—, —alkylene—, —arylene— and a combination thereof; $L^2$ is a single bond or a divalent linking group selected from the group consisting of —O—, —CO—, —SO$_2$—, —NH—, —alkylene—, —arylene— and a combination thereof; and each of $R^1$ and $R^2$ is a hydrocarbon group containing 10 or more carbon atoms.

Examples of the divalent linking groups formed by the combinations are the same as those examples described in the formulas (FRU-I) and:(FRU-II).

In contrast to the above-described orientation layer for vertical alignment, it is important not to reduce a surface energy of an orientation layer for essentially horizontally aligning rod-like liquid crystal molecules. In detail, it is preferred not to introduce a functional group decreasing the surface energy (e.g., a hydrocarbon group having 10 or more carbon or fluorine atoms) into the polymer. In other words, known orientation layers for rod-like liquid crystal molecules can be used.

The known orientation layers are described in various publications [e.g., S. Matsumoto, "Liquid crystal display techniques (Japanese)", pp. 196–201(1996)]. Further, a lot of orientation layers for liquid crystal cells are commercially available. In the present invention, such known or commercially available orientation layers can be used as the orientation layer for horizontal alignment.

It is also possible to horizontally align the rod-like liquid crystal molecules without the orientation layer. For example, in the case that an optically anisotropic layer comprising rod-like liquid crystal molecules is provided on an optically anisotropic layer comprising discotic liquid crystal molecules, the latter layer can function as the orientation layer. Otherwise, before a coating liquid of rod-like liquid crystal molecules is applied on a temporary support (described below), the temporary support or an intermediate layer (described below) may be subjected to rubbing treatment so that it may function as the orientation layer.

The polymer used in the orientation layer has a polymerization degree preferably in the range of 200 to 5,000, and more preferably in the range of 300 to 3,000. The polymer has a molecular weight preferably in the range of 9,000 to 200,000, and more preferably in the range of 13,000 to 130,000.

Two or more polymers can be used in combination.

The orientation layer is preferably formed by rubbing the polymer layer. The rubbing treatment can be conducted by rubbing a layer with paper or cloth several times along a certain direction.

Preparation of Phase Retarder

The optically anisotropic layer is prepared by coating a temporary support or an intermediate layer on the temporary support with a coating solution containing liquid crystal molecules, the following polymerization initiator and other additives.

As the temporary support, a glass plate or a polymer film is preferably used. Preferably, a thermoplastic resin layer is provided between the temporary support and the optically anisotropic layer or between the temporary support and the orientation layer, so that the formed optically anisotropic layer may be easily peeled from the temporary support. The thermoplastic resin preferably soften or become adherent at 150° C. or below. Further, it is preferred that the resin be easily soluble in a particular solvent (e.g., alkali aqueous solution) so as to be easily removed. Thermoplastic resins soluble in alkali aqueous solutions are proposed in the field of photosensitive transferring material (e.g., in Japanese Patent Provisional Publication Nos. 5(1993)-72724 and 5(1993)-173320). These resins can be used for preparing the phase retarder of the invention.

For improving the adhesion between the thermoplastic resin layer and the optically anisotropic layer, an intermediate layer may be provided.

A solvent for the preparation of the coating solution preferably is an organic solvent. Examples of the organic solvents include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The coating solution can be coated according to a conventional coating method such as an extrusion coating method, a direct gravure coating method, a reverse gravure coating method, a die coating method or a bar coating method.

After applying the coating solution, the aligned liquid crystal molecules are fixed with the alignment maintained. The liquid crystal molecules are preferably fixed by a polymerization reaction of the polymerizable groups (p) introduced in the molecules. The polymerization reaction can be classified a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367, 661, 2,367,670), acyloin ethers (described in U.S. Pat. No. 2,448,828), α-hydrocarbon substituted aromatic acyloin compounds (described in U.S. Pat. No. 2,722,512), polycyclic quinone compounds (described in U.S. Pat. Nos. 2,951,758, 3,046,127), combinations of triarylimidazole dimers and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution of the layer.

The light irradiation for the photo polymerization is preferably conducted by an ultraviolet ray.

The exposure energy is preferably in the range of 20 to 50,000 mJ per cm$^2$, and more preferably in the range of 100 to 800 mJ per cm$^2$. The light irradiation can be conducted with the layer heated so as to accelerate the photo polymerization reaction.

According to use of the phase retarder and the circularly polarizing plate, the optically anisotropic layer can be subjected to pattern exposure. By the pattern exposure, only the exposed area is hardened to prepare an optically anisotropic layer consisting of the patterned hardened area.

The aforementioned procedures of coating, aligning and hardening are repeated to prepare a phase retarder comprising the optically anisotropic layers A and B.

After peeled from the temporary support, the phase retarder is used. For example, the peeled phase retarder and a polarizing membrane are laminated to prepare a circularly polarizing plate. In the case that the quarter wave plate is placed in the liquid crystal cell, the formed phase retarder is transferred from the temporary support onto one substrate of the cell.

After the phase retarder is peeled or transferred, the orientation layer and the thermoplastic resin layer (which now come into disuse) may be removed. If the aligned liquid crystal molecules are fixed by a polymerization reaction with the alignment maintained, now the molecules can keep the alignment without the orientation layer.

Use of Phase Retarder

The phase retarder of the invention is particularly suitably used as a quarter wave plate used in a liquid crystal display of reflection type, a pick-up for writing on optical discs, a quarter wave plate used in a GH-LCD and a PS conversion devise, or a quarter wave plate used as an anti-reflection film. The quarter wave plate is generally used in combination with a polarizing membrane, and hence it is preferred to beforehand combine the quarter wave plate and the polarizing membrane to prepare a circularly polarizing plate, which is thereby easily installed in a devise such as a liquid crystal display of reflection type.

The polarizing membrane can be classified into an iodine type polarizing membrane, a dichromatic dye type polarizing membrane and a polyene type polarizing membrane. The iodine type polarizing membrane and the dye type polarizing membrane is usually made of a polyvinyl alcohol film. The polarizing axis (transmission axis) of the polarizing membrane is perpendicular to the stretching direction of the film.

EXAMPLE 1

Preparation of Optically Anisotropic Layer A

A diluted solution of a polyamic acid denatured with steroid was coated on a glass plate (temporary support) by means of a bar coater to form a layer of 0.5 μm thickness, and air-dried at 60° C. for 2 minutes. The surface was subjected to a rubbing treatment to form an orientation layer comprising the following denatured polyimide.

Denatured Polyimide (Repeating Unit)

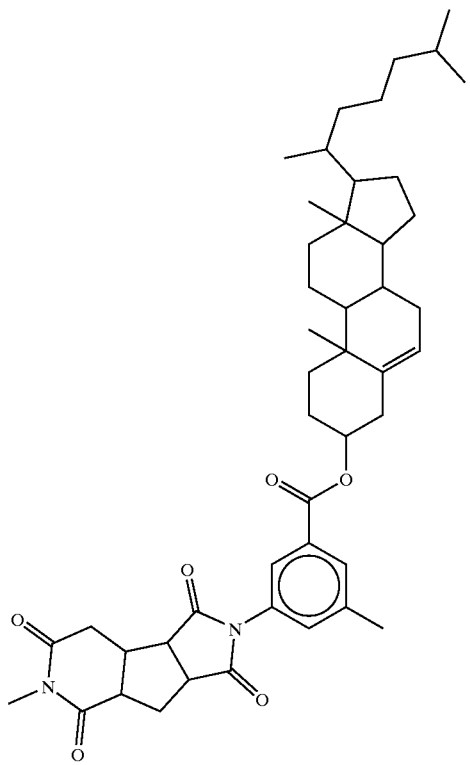

On the thus-formed orientation layer, the following coating solution was coated and dried at 130° C. for 5 minutes to align the discotic liquid crystal molecules vertically. The layer had 4.0 μm thickness, and was irradiated with an ultraviolet ray to polymerize the discotic liquid crystal molecules. Thus, an optically anisotropic layer A was formed.

The retardation value of the optically anisotropic layer A was measured at 550 nm to find 270 nm.

| Coating solution for optically anisotropic layer A | |
|---|---|
| The following discotic liquid crystal molecule (1) | 32.6 weight parts |
| Cellulose acetate butyrate | 0.7 weight part |
| The following denatured trimethylolpropane triacrylate | 3.2 weight parts |
| The following sensitizer | 0.4 weight part |
| The following photopolymerization initiator | 1.1 weight part |
| Methyl ethyl ketone | 62.0 weight parts |

Discotic Liquid Crystal Compound (1)

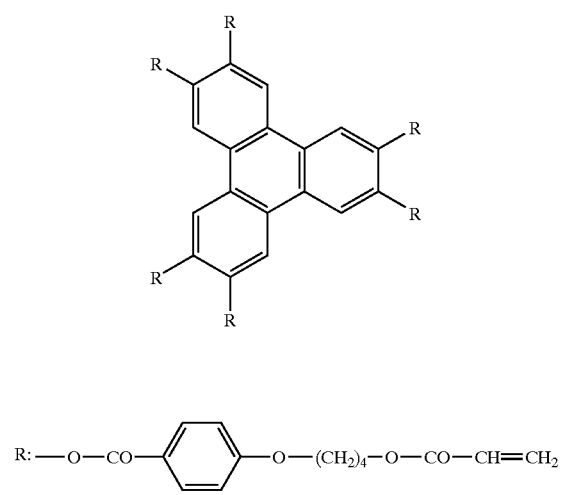

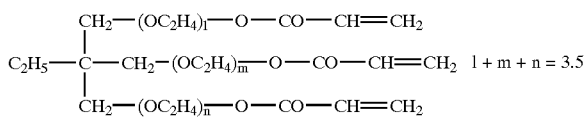

Denatured Trimethylolpropane Triacrylate

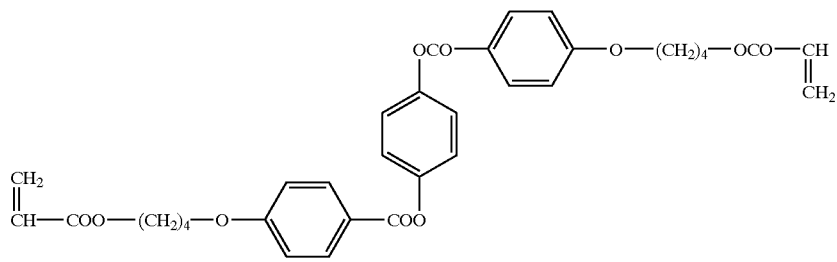

Sensitizer

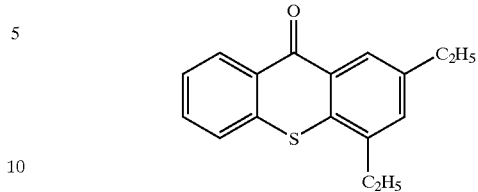

Photopolymerization Initiator

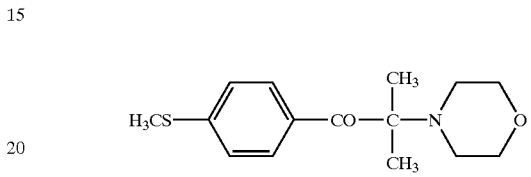

Preparation of Optically Anisotropic Layer B

On the optically anisotropic layer A, a commercially available coating solution for preparing polyimide orientation layer of rod-like liquid crystal molecules (SE-130, Nissan Chemicals Co., Ltd.) was applied and dried at 200° C. for 30 minutes. The surface of the formed polyimide orientation layer was subjected to a rubbing treatment at an angle of 60° to the slow axis of the optically anisotropic layer A.

On the orientation layer, a coating solution comprising 43.5 wt. % of the following rod-like liquid crystal molecules (1), 43.5 wt. % of the following rod-like liquid crystal molecules (2) and 3 wt. % of the above-shown photopolymerization initiator dissolved in chloroform is coated and dried at 130° C. for 3 minutes to align the rod-like liquid crystal molecules horizontally. The thickness of the formed layer was 1.0 μm. The layer was then irradiated with an ultraviolet ray of a mercury lamp (500 w/cm²) to polymerize the rod-like liquid crystal molecules. Thus, an optically anisotropic layer B was prepared.

Rod-like Liquid Crystal Compound (1)

Rod-like Liquid Crystal Compound (2)

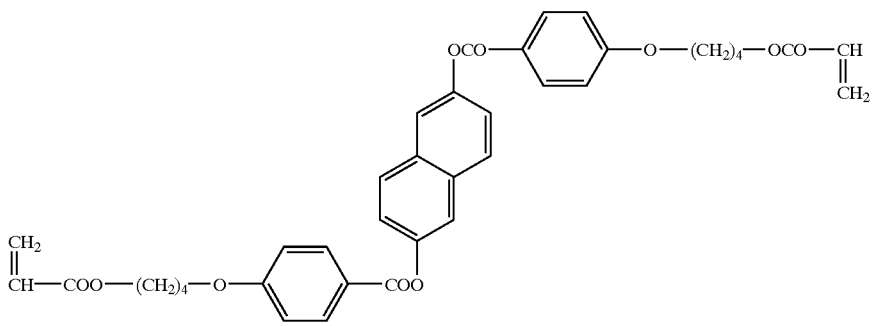

The retardation value of the optically anisotropic layer B was measured at 550 nm to find 138 nm.

The layered body of the layers A and B was peeled from the glass plate to prepare a phase retarder of 5 $\mu$m thickness.

EXAMPLE 2

Preparation of Thermoplastic Resin Layer

On a polyethylene terephthalate film (temporary support) of 75 $\mu$m thickness, the following coating solution was applied by means of a spin coater and dried in an oven at 100° C. for 2 minutes to form a thermoplastic resin layer of 15 $\mu$m thickness.

| Coating solution for thermoplastic resin layer | |
|---|---|
| Styrene/acrylic acid copolymer (copolymerization ratio: 60/40, weight average molecular weight: 8,000) | 15 weight parts |
| 2,2-Bis[4-(methacryloxypolyethoxy)phenyl]propane | 7 weight parts |
| Fluorine surface active agent (F-176, Dainippon Ink & Chemicals, Inc.) | 1.5 weight part |
| Propylene glycol monomethyl ether | 28 weight parts |
| Methyl ethyl ketone | 27 weight parts |

Preparation of Intermediate Layer

On the thermoplastic resin layer, the following coating solution was applied by means of a spin coater and dried in an oven at 100° C. for 2 minutes to form an intermediate layer. The surface was subjected to a rubbing treatment with nylon cloth.

| Coating solution for intermediate layer | |
|---|---|
| Polyvinyl alcohol (PVA105, Kuraray Co., Ltd.) | 13 weight parts |
| Polyvinyl pyrrolidone (PVP-K30, Gokyodo sangyo-sha Co., Ltd.) | 6 weight parts |
| Methanol | 173 weight parts |
| Ion-exchanged water | 211 weight parts |

Preparation of Optically Anisotropic Layer B

On the intermediate layer, the following coating solution was applied by means of a spin coater and dried in an oven at 100° C. for 2 minutes to form an optically anisotropic layer B. Further on the optically anisotropic layer B, a polypropylene film (cover sheet) of 12 $\mu$m thickness was laminated.

| Coating solution for optically anisotropic layer B | |
|---|---|
| The rod-like liquid crystal molecules (1) used in Example 1 | 46 weight parts |
| The rod-like liquid crystal molecules (2) used in Example 1 | 45 weight parts |
| The denatured trimethylolpropane triacrylate used in Example 1 | 5 weight parts |
| The sensitizer used in Example 1 | 3 weight parts |
| The photopolymerization initiator used in Example 1 | 1 weight part |
| Methylene chloride | 800 weight parts |

Aluminum was evaporated on a glass substrate, and the evaporated substrate was patterned to form a pixel electrode. On the pixel electrode, a commercially available polyvinyl alcohol solution for orientation layer was coated by means of a spin coater to form an orientation layer of 0.1 $\mu$m thickness. The surface was subjected to a rubbing treatment.

After the cover sheet was peeled from the optically anisotropic layer B, the layer B and the orientation layer on the glass plate were laminated by means of a laminator (pressure: 2 kg/m$^2$, roller temperature: 130° C., transferring speed: 0.2 m/minute).

The temporary support was then peeled and removed from the thermoplastic resin layer.

The optically anisotropic layer B on the glass substrate was heated on a hot plate at 120° C. for 3 minutes, so as to align the rod-like liquid crystal molecules. The layer B was then subjected to pattern exposure with a super high pressure mercury lamp through a photomask (Aligner MAP-1200L, Dainippon screen Co., Ltd.). Thereby, the exposed area of the optically anisotropic layer B was hardened.

The thermoplastic resin layer and the intermediate layer were washed and removed with an alkali aqueous solution (T-PD2, Fuji Photo Film Co., Ltd.), and then unexposed area (unhardened area) of the optically anisotropic layer B was removed with methylene chloride.

The optically anisotropic layer B was then heated in an oven at 220° C. for 20 minutes to further harden the exposed area. The thickness of the formed layer B was 1.1 $\mu$m.

The retardation value of the optically anisotropic layer B was measured at 550 nm to find 135 nm.

Preparation of Optically Anisotropic Layer A

On the optically anisotropic layer B, an orientation layer made of denatured polyimide was formed in the manner described Example 1. After heated at 200° C. for 1 hour, the orientation layer was subjected to a rubbing treatment at an angle of 30° to the slow axis of the optically anisotropic layer B.

The following coating solution was coated on the orientation layer by means of a bar coater, and dried at 130° C. for 5 minutes to align the discotic liquid crystal molecules vertically. The formed layer has 4.2 μm thickness, and was irradiated with an ultraviolet ray to polymerize the discotic liquid crystal molecules. Thus, an optically anisotropic layer A was formed.

The retardation value of the optically anisotropic layer A was measured at 550 nm to find 265 nm.

| Coating solution for optically anisotropic layer A | |
| --- | --- |
| The discotic liquid crystal molecule (1) used in Example 1 | 32.6 weight parts |
| Cellulose acetate butyrate | 0.7 weight part |
| The following denatured trimethylolpropane triacrylate | 3.2 weight parts |
| The following sensitizer | 0.4 weight parts |
| The following photopolymerization initiator | 1.1 weight parts |
| Methyl ethyl ketone | 62.0 weight parts |

Thus, a phase retarder (a layered body of optically anisotropic layers A and B) of 5.4 μm thickness was prepared.

Preparation of Liquid Crystal Cell Containing Quarter Wave Plate

On the optically anisotropic layer A, a commercially available coating solution for preparing polyimide orientation layer (SE-150, Nissan Chemicals Co., Ltd.) was applied by means of a spin coater and dried at 80° C. for 20 minutes. After further heated at 250° C. for 30 minutes to form imide bonds, the layer was subjected to a rubbing treatment at an angle of 15° to the slow axis of the optically anisotropic layer A (at an angle of 75° to the slow axis of the optically anisotropic layer B).

Independently, the above coating solution was applied onto another substrate by means of a spin coater and dried at 80° C. for 20 minutes. After further heated at 250° C. for 30 minutes to form imide bonds, the layer was subjected to a rubbing treatment.

The substrate having a quarter wave plate and the other substrate was laminated so that the orientation layers might be faced and that their rubbing directions might be reversely parallel. As the adhesive, a thermoplastic epoxy resin containing spherical spacers (diameter: 7 μm) was used. A p-type rod-like liquid crystal compound (ZLI-1132, Merck Japan Co., Ltd.) mixed with 2 wt. % of a dichromatic dye (NKX-1366, Nippon Kanko Shikiso Co., Ltd.) was injected into the space between the substrates, and the sides were sealed.

When voltage was applied to the thus-prepared liquid crystal cell to work, the cell displayed an image with very high contrast.

EXAMPLE 3

Preparation of Optically Anisotropic Layer B

Aluminum was evaporated on a glass substrate. On the substrate, a commercially available polyvinyl alcohol solution for orientation layer was coated by means of a spin coater to form an orientation layer of 0.1 μm thickness. The surface was subjected to a rubbing treatment.

The following coating solution was coated on the orientation layer by means of a bar coater, and heated at 115° C. to align the rod-like liquid crystal molecules. The formed layer was irradiated with an ultraviolet ray to polymerize the rod-like liquid crystal molecules. Thus, an optically anisotropic layer B was formed (thickness: 0.8 μm).

The retardation value of the optically anisotropic layer B was measured at 550 nm to find 135 nm.

| Coating solution for optically anisotropic layer B | |
| --- | --- |
| The rod-like liquid crystal molecules (1) used in Example 1 | 91 weight parts |
| The denatured trimethylolpropane triacrylate used in Example 1 | 5 weight parts |
| The sensitizer used in Example 1 | 3 weight parts |
| The photopolymerization initiator used in Example 1 | 1 weight part |
| Methylene chloride | 800 weight parts |

Preparation of Optically Anisotropic Layer A

On the optically anisotropic layer B, an orientation layer made of denatured polyimide was formed in the manner described Example 1. After heated at 200° C. for 1 hour, the orientation layer was subjected to a rubbing treatment at an angle of 30° to the slow axis of the optically anisotropic layer B.

The coating solution for optically anisotropic layer A used in Example 2 was coated on the orientation layer by means of a bar coater, and dried at 130° C. for 5 minutes to align the discotic liquid crystal molecules vertically. The formed layer had 3.9 μm thickness, and was irradiated with an ultraviolet ray to polymerize the discotic liquid crystal molecules. Thus, an optically anisotropic layer A was formed.

The retardation value of the optically anisotropic layer A was measured at 550 nm to find 265 nm.

Thus, a phase retarder (a layered body of optically anisotropic layers A and B) of 4.7 μm thickness was prepared.

Preparation of Liquid Crystal Cell Containing Quarter Wave Plate

On the optically anisotropic layer A, a commercially available coating solution for preparing polyimide orientation layer (SE-150, Nissan Chemicals Co., Ltd.) was applied by means of a spin coater and dried at 80° C. for 20 minutes. After further heated at 250° C. for 30 minutes to form imide bonds, the layer was subjected to a rubbing treatment at an angle of 15° to the slow axis of the optically anisotropic layer A (at an angle of 75° to the slow axis of the optically anisotropic layer B).

Independently, the above coating solution was applied onto another substrate by means of a spin coater and dried at 80° C. for 20 minutes. After further heated at 250° C. for 30 minutes to form imide bonds, the layer was subjected to a rubbing treatment.

The substrate having a quarter wave plate and the other substrate was laminated so that the orientation layers might be faced and that their rubbing directions might be reversely parallel. As the adhesive, a thermoplastic epoxy resin containing spherical spacers (diameter: 7 μm) was used. A p-type rod-like liquid crystal compound (ZLI-1132, Merck Japan Co., Ltd.) mixed with 2 wt. % of a dichromatic dye (NKX-1366, Nippon Kanko Shikiso Co., Ltd.) was injected into the space between the substrates, and the sides were sealed.

When voltage was applied to the thus-prepared liquid crystal cell to work, the cell displayed an image with very high contrast.

We claim:

1. A phase retarder which comprises an optically anisotropic layer A essentially giving the phase retardation of $\pi$ at wavelength of 550 nm and an optically anisotropic layer B essentially giving the phase retardation of $\pi/2$ at wavelength of 550 nm, said layers A and B being laminated so that the retarder has such an optical characteristic that a retardation value per wavelength is within the range of 0.2 to 0.3 at each wavelength of 450 nm, 550 nm and 650 nm, wherein the total thickness of the optically anisotropic layers A and B is within the range of 500 nm to 20 $\mu$m.

2. The phase retarder as defined in claim 1, wherein at least one of the optically anisotropic layers A and B comprises liquid crystal molecules.

3. The phase retarder as defined in claim 2, wherein at least one of the optically anisotropic layers A and B comprises discotic liquid crystal molecules.

4. The phase retarder as defined in claim 3, wherein one of the optically anisotropic layers A and B comprises discotic liquid crystal molecules, and the other comprises rod-like liquid crystal molecules.

5. The phase retarder as defined in claim 3, wherein the discotic liquid crystal molecules in the optically anisotropic layer A or B are oriented in essentially vertical alignment.

6. The phase retarder as defined in claim 5, wherein the discotic liquid crystal molecules in the optically anisotropic layer A or B are fixed by a polymerization reaction with their vertical alignment maintained.

7. The phase retarder as defined in claim 4, wherein the rod-like liquid crystal molecules in the optically anisotropic layer A or B are oriented in essentially horizontal alignment.

8. The phase retarder as defined in claim 7, wherein the rod-like liquid crystal molecules in the optically anisotropic layer A or B are fixed by a polymerization reaction with their horizontal alignment maintained.

9. A circularly polarizing plate which comprises a phase retarder and a polarizing membrane provided thereon, said phase retarder comprising an optically anisotropic layer A essentially giving the phase retardation of TC at wavelength of 550 nm and an optically anisotropic layer B essentially giving the phase retardation of $\pi/2$ at wavelength of 550 nm, said layers A and B being laminated so that the retarder may have such an optical characteristic that a retardation value per wavelength is within the range of 0.2 to 0.3 at each wavelength of 450 nm, 550 nm and 650 nm, wherein the total thickness of the optically anisotropic layers A and B is within the range of 500 nm to 20 $\mu$m.

* * * * *